United States Patent [19]
Cox et al.

[11] Patent Number: 5,501,525
[45] Date of Patent: Mar. 26, 1996

[54] BONE-GUARD BAG

[75] Inventors: Stanley J. Cox; Kevin M. Byers, both of Newnan, Ga.

[73] Assignee: Winpak Films, Inc., Senoia, Ga.

[21] Appl. No.: 201,368

[22] Filed: Feb. 24, 1994

[51] Int. Cl.[6] .......................... B65D 30/08; B65D 33/01
[52] U.S. Cl. .................. 383/103; 53/434; 53/512; 206/524.8; 383/101; 383/119; 426/129
[58] Field of Search .......................... 206/524.8; 383/119, 383/101, 103; 53/434, 512; 426/124, 129

[56] References Cited

U.S. PATENT DOCUMENTS

| | | | |
|---|---|---|---|
| 2,292,295 | 8/1942 | Royal | 53/434 |
| 3,494,457 | 2/1970 | Titchenal | 383/101 |
| 3,528,600 | 9/1970 | White | 383/101 |
| 3,574,642 | 4/1971 | Weinke. | |
| 3,673,758 | 7/1972 | Esty | 53/434 |
| 4,155,453 | 5/1979 | Ono. | |
| 4,190,158 | 2/1980 | Ambrose. | |
| 4,434,893 | 3/1984 | Barlow. | |
| 4,727,706 | 3/1988 | Beer | 426/124 |
| 4,734,292 | 3/1988 | Van Boxtel | 53/434 |
| 4,815,590 | 3/1989 | Peppiott et al. | 383/119 |
| 5,354,569 | 10/1994 | Brown et al. | 53/434 |

FOREIGN PATENT DOCUMENTS

| | | |
|---|---|---|
| 541702 | 4/1956 | Italy. |
| 654570 | 6/1963 | Italy. |

*Primary Examiner*—Stephen P. Garbe
*Attorney, Agent, or Firm*—Jones, Day, Reavis & Pogue

[57] ABSTRACT

An improved bone-guard bag for packaging meats and other foods for longer term preservation during storage and transport, comprising an oxygen and moisture-impermeable outer bag and a puncture-resistant inner bag for preventing bones and other sharp surfaces of the packaged food from penetrating the inner and outer bags to compromise the oxygen and moisture-resistant integrity thereof. Vent means are provided in the bone-guard bag to permit oxygen evacuation, gas flushing, and sealing of both the inner and outer bags simultaneously. The inner bag is secured to the outer bag to allow movement relative to each other, while facilitating insertion of food therein. The outer bag is preferably made from a coextrusion of separate polyethylene and nylon layers bonded together. The inner bag is preferably made from at least two unbonded plies of polyethylene film for increased puncture resistance.

13 Claims, 3 Drawing Sheets

BONE-GUARD BAG

BACKGROUND OF THE INVENTION

The present invention relates generally to packaging materials, and more specifically to an improved double bag construction for packaging meats and other foods for longer term preservation during storage and transport.

Several different forms of packaging are known for containing meats and other foods under refrigerated conditions in order to preserve them during storage and transport until they are ready to be marketed to the consumer. For meat in particular, it is important not only to preserve its freshness, but also its red color, which is associated by consumers with freshness.

It is well known that fresh meat quality may be maintained longer under anaerobic conditions than aerobic conditions. While fresh, such meat has a purple-red color that relatively few consumers associate with freshness. However, when oxygenated by reexposure to air to convert myoglobins in the meat to oxymyoglobins, the color quickly changes to the generally acceptable bright red color. Therefore, any packaging must minimize exposure of the meat during storage and transportation to atmospheric oxygen, while permitting the meat to bloom to its full red color upon removal of the packaging prior to its placement for display and sale to the consumer.

One such form of packaging has constituted an inner container constructed from, e.g., chip board or cheese cloth, which in turn is contained by an oxygen impermeable, outer flexible bag. However, several disadvantages are created by such a construction. First, the inner chip board or cheese cloth container readily absorbs blood and other liquid materials found in the foods to be packaged, thereby allowing bone and other sharp, rigid matter easily to penetrate the inner container and outer bag during the vacuuming procedure needed to remove air during the packaging process, as well as its subsequent shipping and handling. This, in turn, ruins the very anaerobic conditions needed for preservation. Second, the inner container absorbs oxygen and other gasses before the vacuuming and flushing procedures, which dilutes the gas (usually carbon dioxide or nitrogen) flushed into the bag that is needed to replace the exhausted oxygen gas. Third, an inner container made from chip board is relatively inflexible, thereby increasing storage and shipping space demands, as well as being heavier than plastic, which translates into increased shipping weights and the costs associated therewith.

U.S. Pat. No. 3,574,642 issued to Weinke discloses another packaging construction for meats in the form of an inner oxygen-permeable bag which may be either gas flushed or evacuated, and an outer oxygen-impermeable bag, which may likewise be gas flushed or evacuated. Upon placement of the meat into the inner bag, the bag is heat sealed after removal of oxygen. The inner bag is then inserted into the outer bag from which all oxygen is removed, and the outer bag is then heat sealed. While the Weinke packaging construction is more flexible and light-weight than the prior art plastic bag/chip board container combination, it requires two separate and consecutive oxygen evacuation and gas flushing steps, as well as two separate and consecutive heat sealing steps. This increases the time needed to package the piece of meat, and therefore the costs of the entire packaging operation. The Weinke inner bag must be sealed because it is used to display the meat for the customer after the oxygen-impermeable outer bag is removed to permit the meat to bloom.

Still a third construction of food packaging is a bone-guard bag previously sold by the Winpak Films Division of Flex-On, Inc., the assignee of the present invention. It consisted of an oxygen and moisture-impermeable outer plastic bag, and an inner plastic bag that was inserted into the outer bag at the time of manufacture and heat sealed into place. This preseal allowed easy opening of both the inner and outer bags simultaneously as, e.g., a piece of meat was placed inside the inner bag. This inner bag, in turn, was made from a puncture-resistant plastic film in order to reduce the likelihood that a bone in the meat could puncture the inner and outer bags to allow air and moisture to contact and spoil the meat.

While the Winpak Films bone-guard bag proved superior to competing packaging products for preserving meats, it suffered from several deficiencies. First, the inner bag proved susceptible to being punctured by bones in some instances. This caused the less puncture-resistant outer bag to become vulnerable to puncture as well. Second, the heat seal that secured the inner bag to the outer bag extended across the entire top of the bag, thereby completely sealing off the area between the inner and outer bags. This feature made gas flushing and complete evacuation of oxygen in this area impossible by the customer. Should a puncture be created in the inner bag, the oxygen trapped in this unevacuated region between the two bags could readily come into contact with the meat.

SUMMARY OF THE INVENTION

Accordingly, it is an object of the present invention to provide a bone-guard bag having an inner bag and an outer bag wherein the outer bag is made from an oxygen and moisture-impermeable material that protects the meat or other food contained within the bone-guard bag once oxygen-bearing air is flushed and evacuated therefrom.

Another object of the present invention is to provide a bone-guard bag wherein the inner bag is made from a high-impact material that is resistant to puncture by bones or other rigid surfaces found in meats and other foods.

Yet another object of the present invention is to provide a bone-guard bag wherein the inner and outer bags are made from light-weight plastic materials that reduce the weight and associated shipping costs of a large number of units of packaged meats or other foods.

Still another object of the present invention is to provide a bone-guard bag wherein the inner and outer bags are made from a flexible plastic material that will collapse and conform to the shape of the enclosed product upon removal of air therefrom in order to reduce the space required by the packaged meats or other foods during shipping or storage.

Yet another object of the present invention is to provide a bone-guard bag wherein the inner bag is secured to the outer bag at several locations to permit easy insertion of meats or other foods therein, while still allowing movement of the inner bag with respect to the outer bag in order to reduce the localized penetration against a single point on the outer bag of a bone or other rigid surface protruding through the inner bag.

Still another object of the present invention is to provide a bone-guard bag wherein the inner bag is made from two or more plies that provide greater puncture resistance than does a single-ply film of the same aggregate thickness.

Yet another object of the present invention is to provide a bone-guard bag wherein vents are formed in the inner bag to ensure complete, one-step gas flushing and evacuation of both the inner and outer bags.

Other objects of the present invention, in addition to those set forth above, will become apparent to those skilled in the art from the following disclosure.

Briefly, the invention is directed to providing an improved bone-guard bag for packaging meats and other foods for longer term preservation during storage and transport, comprising an oxygen and moisture-impermeable outer bag and a puncture-resistant inner bag for preventing bones and other sharp surfaces of the packaged food from penetrating the inner and outer bags to compromise the oxygen and moisture-resistant integrity thereof. Vent means are provided in the bone-guard bag to permit oxygen evacuation, gas flushing, and sealing of both the inner and outer bags simultaneously. The inner bag is secured to the outer bag to allow movement relative to each other, while facilitating insertion of food therein. The outer bag is preferably made from a co-extrusion of separate polyethylene and nylon layers bonded together. The inner bag is preferably made from at least two unbonded plies of polyethylene film for increased puncture resistance.

DETAILED DESCRIPTION OF THE PREFERRED EMBODIMENT

Figure 1:
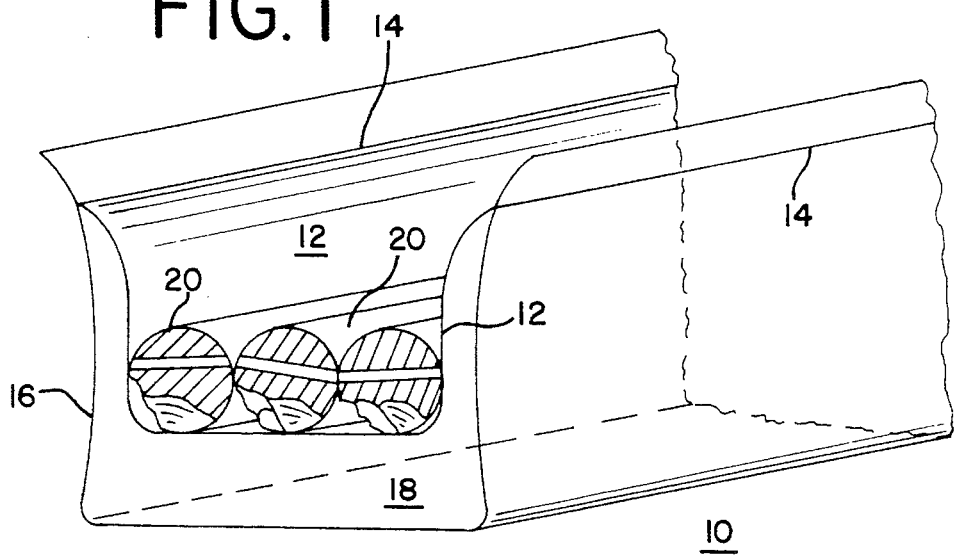
FIG. 1 shows a perspective view of the bone-guard bag of the present invention.

As illustrated in FIG. 1, bone-guard bag 10 comprises an inner bag 12 that is heat sealed at 14 along or near its top edge to the interior surface of outer bag 16. Region 18 is defined between inner and outer bags 12 and 16, respectively. Because the heat seal 14 is located near the top edge of inner bag 12, inner bag 12 may freely move with respect to outer bag 16 while still being secured thereto to facilitate placement of food such as meat 20 into inner bag 12. At the same time, there is no need to separately insert inner bag 12 into outer bag 16 during the packaging process.

Figure 2:
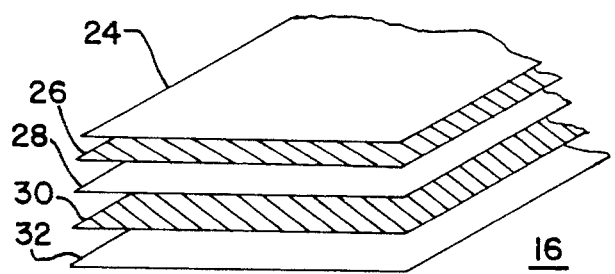
FIG. 2 shows a perspective view of the co-extruded plastic material used to form the outer bag of the bone-guard bag.

Outer bag 16 should be made from a light-weight and flexible material that reduces the weight of filled bone-guard bag 10 and the space taken up by packaged meat 20 during shipping and storage. Moreover, outer bag 16 should be made from an oxygen and moisture-impermeable material that protects meat 20 from air and moisture during shipping and storage for an enhanced period of time prior to display to the consumer. While any of a number of plastic films will serve this purpose, particularly polyethylene film, it has been found that the five-layer co-extruded construction shown in FIG. 2 provides a superior oxygen and moisture barrier.

More specifically, layer 28 consists of nylon, which provides a functional barrier against oxygen and moisture penetration. Meanwhile, layers 24 and 32 consist of polyethylene, which enhances the sealability of the composite bag structure, and reduces curl. Layers 26 and 30 comprise adhesive that is used to bond nylon layer 28 and polyethylene layers 24 and 32 together.

Inner bag 12 is preferably made from a polyethylene film. While inner bag 12 may be formed from a single ply, it is preferred that it be made from two unbonded plies, each one half the thickness of the single-ply alternative. Three or more plies could likewise be used, which in the aggregate equal the thickness of a single ply. Such a construction has been found to provide enhanced puncture resistance.

In order to test the puncture resistance of a multiple-ply inner bag 12, film was prepared, using a blend of 70% fractional melt low-density polyethylene and 30% linear low-density polyethylene. Both resins were supplied by Mobil Polymers. Six mil and 3 mil films were prepared in this manner.

Figure 3:
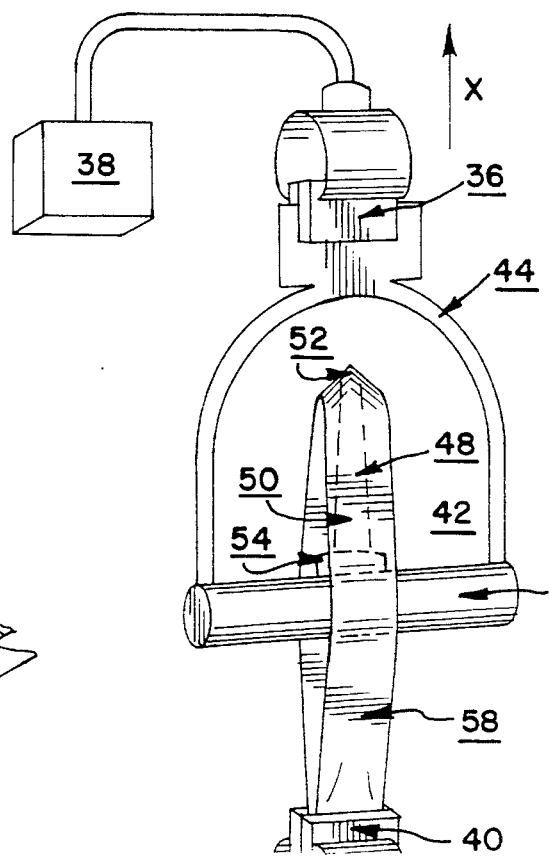
FIG. 3 shows a schematic of a tensile strength machine used to test the puncture resistance of plastic material employed to form the inner bag of the bone-guard bag.

Next, rectangular samples of the film were cut that measured approximately 1 inch wide and 8–10 inches long. Two sets of tests were run on a modified Instron tensile testing instrument illustrated schematically in FIG. 3. The test machine 34 consisted of an upper jaw 36 movable by a motor 38 in the vertical direction X, and a stationary lower jaw 40. Secured to the lower surface of upper jaw 36 was probe rig 42, comprising a horseshoe-shaped support frame 44 attached to a platform 46 with a probe 48 consisting of bolt 50 having a rounded end 52 secured to platform 46 by means of nut 54 and projecting vertically therefrom.

A sample 58 of the film was secured to test machine 34 with both ends clamped to stationary lower jaw 40, and its mid point positioned above end 52 of probe 48. Once the test machine 34 was activated, punch probe 48 was raised vertically by means of probe rig 42, upper jaw 36, and associated motor 38, thereby drawing end 52 of probe 48 initially into contact with film sample 58, and finally through it to cause a rupture. Upper jaw 36 was separated from stationary lower jaw 40 at a speed of 10 inches/min.

Two sets of tests are depicted in Tables I and II. In the first set shown in Table I, five different single-ply, 6 mil (i.e., 0.006 inch) thick samples were employed. In the second set of tests appearing in Table II, five different double-ply, 3 mil samples were used. In each table, the actual measured thickness of the single or double-ply samples, the initial puncture pressure registered when probe 48 started to separate the film, the ultimate puncture pressure registered when probe 48 completely penetrated the film, and the percent elongation of the film at the ultimate puncture point as a function of the original length are represented.

TABLE I

| | (6 Mil Single Ply) | | | |
| --- | --- | --- | --- | --- |
| Sample # | Actual Thickness (inches) | Initial Puncture Pressure (lbs.) | Ultimate Puncture Pressure (lbs.) | % Elongation At Ultimate Puncture Point |
| 1 | 0.0057 | 7.75 | 9.04 | 57 |
| 2 | 0.0060 | 6.80 | 7.78 | 59 |
| 3 | 0.0063 | 7.16 | 8.25 | 57 |
| 4 | 0.0059 | 6.92 | 7.69 | 61 |

TABLE I-continued (6 Mil Single Ply)

| Sample # | Actual Thickness (inches) | Initial Puncture Pressure (lbs.) | Ultimate Puncture Pressure (lbs.) | % Elongation At Ultimate Puncture Point |
| --- | --- | --- | --- | --- |
| 5 | 0.0057 | 7.80 | 9.22 | 64 |
| Average | 0.0059 | 7.29 | 8.39 | 60 |

TABLE II (3 Mil Double Ply)

| Sample # | Actual Thickness (inches) | Initial Puncture Pressure (lbs.) | Ultimate Puncture Pressure (lbs.) | % Elongation At Ultimate Puncture Point |
| --- | --- | --- | --- | --- |
| 1 | 0.0060 | 8.41 | 10.20 | 64 |
| 2 | 0.0057 | 8.38 | 10.14 | 65 |
| 3 | 0.0056 | 8.90 | 10.52 | 61 |
| 4 | 0.0059 | 8.54 | 9.94 | 60 |
| 5 | 0.0058 | 8.35 | 9.65 | 63 |
| Average | 0.0058 | 8.51 | 10.09 | 63 |

As can be perceived from these test results, it takes significantly more force by a meat bone, etc. to puncture a 3 mil double-ply bag than a 6 mil single-ply bag. This may be due at least in part to the fact that the two plies of the double-ply bag may move with respect to each other, thereby spreading the application of force over a larger surface area than is possible with a single-ply bag.

Inner bag 12 may be gussetted, ungussetted, square bottomed, or any other form that will provide economical storage for the shape of the food product 20 contained therein.

Figure 4:
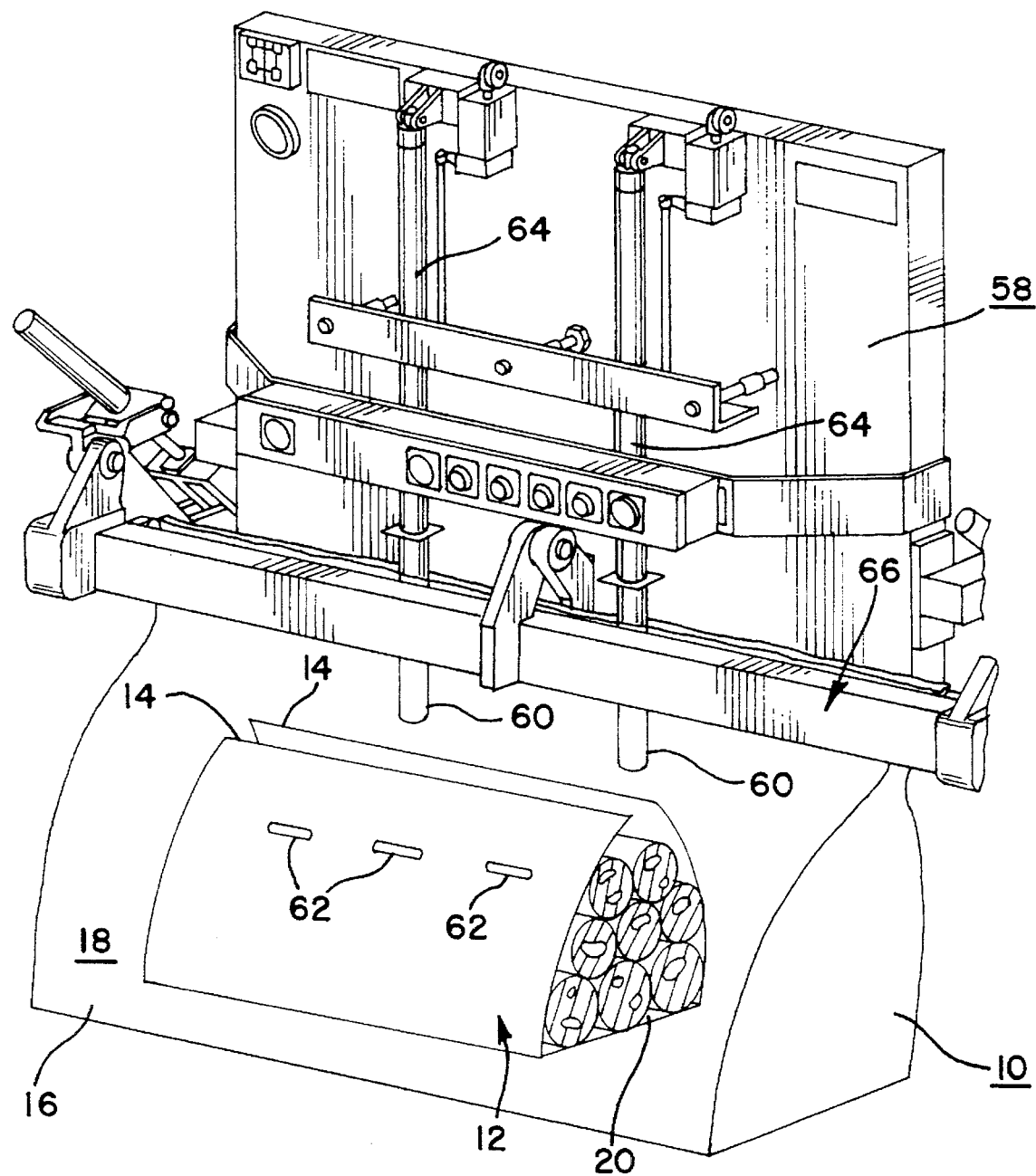
FIG. 4 shows a perspective view of the equipment used to process the bone-guard bag.
Figure 5:
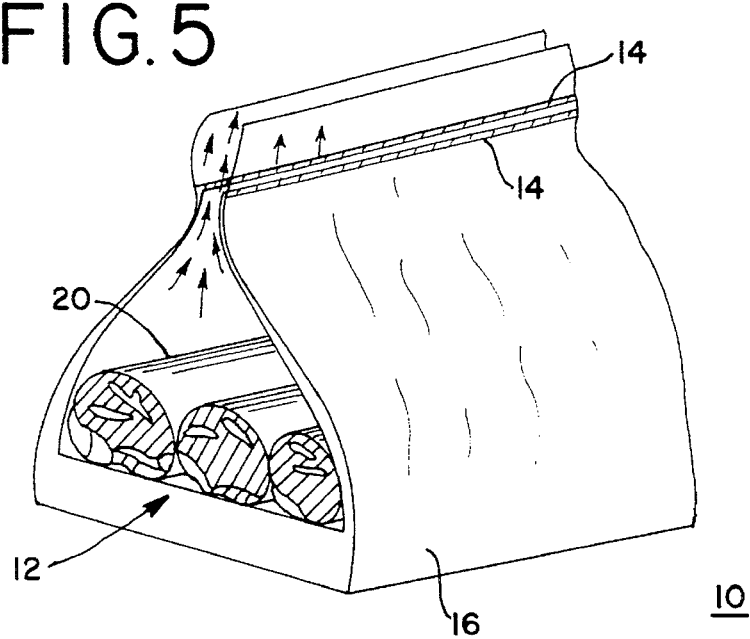
FIG. 5 shows a schematic view of air being evacuated from the bone-guard bag.

FIG. 4 shows a snorkel vacuuming bag machine 58 operably connected to the bone-guard bag 10 of the present invention. Air in inner bag 12 is evacuated (see FIG. 5) by means of snorkels 60. Vents 62 cut in the side of inner bag 12 allow air trapped in sealed region 18 between inner bag 12 and outer bag 16 to be withdrawn into inner bag 12, whereupon it is evacuated from inner bag 12 as well. Thus, air may be simultaneously evacuated from the inner and outer bags in a single step unlike the prior art. Cylinders 64 assists in lowering snorkels 60 into bone-guard bag 10.

Figure 6:
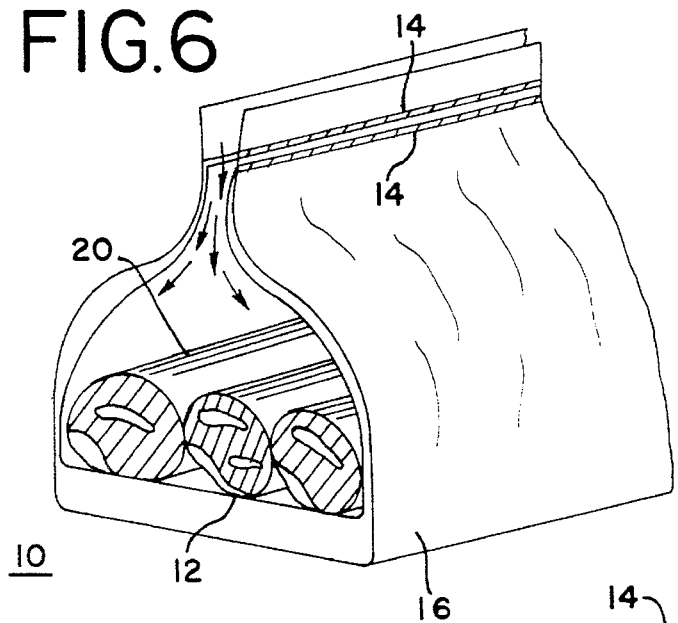
FIG. 6 shows a schematic view of inert gas being flushed into the bone-guard bag to replace the evacuated air.

If desired, a gas like carbon dioxide or nitrogen may be injected (see FIG. 6) by snorkels 60 into inner bag 12, and through vents 62 into sealed region 18 between inner bag 12 and outer bag 16 to replace the evacuated air. Unlike air, the inert gas will not react with meat 20 to convert myoglobins into oxymyoglobins.

Figure 7:
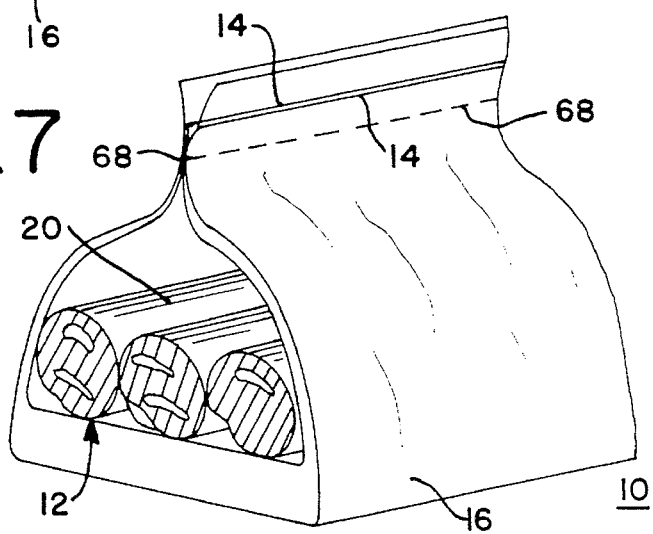
FIG. 7 shows a perspective view of the sealed bone-guard bag.

Finally, sealing bar 66 closes upon outer bag 16 and inner bag 12 to provide a heat seal 68 across their length in a single step so that the inert gasses cannot escape or outside air or moisture enter the bag to spoil meat 20 contained therein (see FIG. 7). While inner bag 12 has been intentionally drawn smaller than outer bag 16 in FIG. 4 for the purpose of illustration, normally the inner bag is only a few inches smaller than the outer bag in the longitudinal direction (i.e., top to bottom) and of the same width as the outer bag.

While particular embodiments of bone-guard bag invention 10 have been shown and described, it should be understood that the invention is not limited thereto, since many modifications may be made. For instance, outer bag 16 could be provided with an outer liner along its exterior surface, similar to the composition of inner bag 12, to protect it from puncture from external sources, in lieu of or in addition to puncture-resistant inner bag 12. Furthermore, both the outer liner and inner bag could have both single and double-ply construction. The invention is therefore contemplated to cover by the present application any and all such modifications which fall within the true spirit and scope of the basic underlying principles disclosed and claimed herein.

What is claimed is:

1. A packaging container for protecting foods from oxygen and moisture contact for preservation during storage or shipment, comprising:

(a) an outer bag made from an oxygen and moisture-impermeable material;

(b) an inner bag made from a puncture-resistant material for containing the food products, said inner bag having an open end with a periphery and having a closed end which can be positioned within the interior of said outer bag, means for securing the periphery of the open end of said inner bag to the interior surface of said outer bag such that the closed end of said inner bag may move within said outer bag; and (c) vent means allowing communication between said inner and outer bags so that air can be evacuated in a single step from both said inner bag and said outer bag such that once said outer and inner bags are sealed simultaneously to prevent reentry of air, the food product contained within said inner bag is protected from oxygen and moisture contact, while the puncture resistance of said inner bag prevents bones or other sharp surfaces of the food from penetrating said inner and outer bags to compromise the oxygen and moisture-resistant integrity of said container.

2. A packaging container as recited in claim 1, wherein the periphery of the open end of said inner bag is secured to said outer bag by means of a continuous heat seal.

3. A packaging container as recited in claim 1, wherein said vent means comprises one or more holes cut in the side of said inner bag.

4. A packaging container as recited in claim 1, wherein the material for said outer bag comprises polyethylene.

5. A packaging container as recited in claim 4, wherein said material comprises a coextrusion of separate layers of polyethylene and nylon bonded together.

6. A packaging container as recited in claim 1, wherein the material for said inner bag comprises polyethylene.

7. A packaging container as recited in claim 1, wherein said inner bag is made from a material comprising a single ply.

8. A packaging container as recited in claim 1, wherein said inner bag is made from a material comprising at least two separate, unbonded plies.

9. A packaging container as recited in claim 1, further comprising a puncture-resistant liner secured to the exterior surface of said outer bag for protection from puncture by external sources.

10. A packaging container as recited in claim 9, wherein said liner is made from a material comprising a single ply.

11. A packaging container as recited in claim 9, wherein said puncture-resistant outer liner is made from a material comprising at least two separate, unbonded plies.

12. A packaging container as recited in claim 1, wherein said inner and outer bags are flexible and light-weight.

13. A packaging container as recited in claim 1, wherein said inner bag is gussetted, non-gussetted, or square-bottomed.

* * * * *